US006889415B1

(12) United States Patent
Morris et al.

(10) Patent No.: US 6,889,415 B1
(45) Date of Patent: May 10, 2005

(54) BULL NOSE CLINCHER

(76) Inventors: Jimmy E. Morris, 1343 Douglas Ave., Crescent City, CA (US) 95531; Lois A. Young, 1343 Douglas St., Crescent City, CA (US) 95531

( * ) Notice: Subject to any disclaimer, the term of this patent is extended or adjusted under 35 U.S.C. 154(b) by 126 days.

(21) Appl. No.: 10/342,465

(22) Filed: Jan. 14, 2003

(51) Int. Cl.[7] .................................................. B23Q 5/00
(52) U.S. Cl. ......................................... 29/283.5; 29/275
(58) Field of Search ............................. 29/283.5, 243.5, 29/278, 275, 243.56, 243.58, 243.57; 72/325, 450

(56) References Cited

U.S. PATENT DOCUMENTS 4,593,443 A * 6/1986 Wolford .................... 29/243.5
4,670,957 A * 6/1987 Wolford .................... 29/243.5
6,308,402 B1 * 10/2001 Ellis ............................ 29/715
2002/0062551 A1 * 5/2002 Jacoby ........................ 29/798

* cited by examiner

*Primary Examiner*—Lee D. Wilson

(57) ABSTRACT

A bull nose clincher for putting a rounded edge on a corner bead. The device comprises an elongate position registration member that has a first and second linear front faces forming substantially a right angle, and an arcuate center front face located therebetween. The first linear front face has a first slot and the second linear front face has a second slot therein. A tube is connected to the position registration member back portion. A striker is slidably connected to the tube. A first crimping pin is connected to the striker, and is capable of extending through the first slot A second crimping pin is connected to the striker and is capable of extending through the second slot.

9 Claims, 3 Drawing Sheets

BULL NOSE CLINCHER

BACKGROUND OF THE INVENTION

1. Field of the Invention

The present invention relates to a bull nose clincher for use in connection with drywall corner connections. The bull nose clincher has particular utility in connection with crimping device for applying bull nose corners to dry wall corner connections.

2. Description of the Prior Art

Bull nose clinchers are desirable for fastening beads to drywall corners. A need was felt for a bull nose clincher that would apply a rounded surface corner instead of a square corner as is presently done.

The use of drywall corner connections is known in the prior art. For example, U.S. Pat. No. 5,333,483 to Smith discloses a Bull nose applicator for applying a bull nose to adjacent dry wall panels, the apparatus comprising an elongated channel member having a bull nose application surface defined by a central, partially curved portion intersected by a pair of mutually perpendicular flat side portions, the channel member including a pair of transversely disposed slots proximal to one end thereof in which a pair of opposed crimping members are situated and pivotally attached to the channel member for rotation between a first, stored position and a second, crimping position, the crimping members each including a specially configured cutting surface defined by a curved planform having a compound curvature which tapers to a knife edge along symmetrical radii in, the apparatus further including a linkage mechanism attached to the crimping members for reciprocating, the crimping members between the aforementioned first and second positions, respective, the linkage mechanism comprising a spring loaded anvil member which may be struck by a hammer or mallet, slidably disposed on an elongated rigid shaft attached to and extending outward from the channel member, and dual link pairs pivotally attached to the anvil member and the crimping members at opposite ends thereof, respectively. However, the Smith '483 patent does not have springs in each of the clamping members to individually squeeze a corner bead over an entire length.

Similarly, U.S. Pat. No. 4,670,957 to Wolford discloses a Tool for crimping a corner bead piece over an exterior plasterboard corner that has two faces substantially normal to one another across an interior corner, which fit then against and over a corner bead piece, which in turn is positioned against and over an exterior structural corner of meeting plasterboard sheets. A post extends rearwardly away from the faces, and a striker is mounted to move on the post. A crimping pin is carried relative to each face, connected at their remote ends to the striker, and connected relative to the frame by means of a shaft fitting through an angled slot in each crimping pin. As arranged, each crimping pin is operable to move from one axial position with a die end recessed behind the faces to another axial position with the die end projected forwardly beyond the faces. The crimping pins are angled relative to one another and relative to each respective tool face. Movement of each crimping pin from the recessed position to the projected position, causes the die end initially to just pass over the edge of the underlying corner bead piece and then to move laterally against the edge of the underlying corner bead piece. The striker is hit with a mallet to drive the crimping pins with enough force to crimp the corner bead piece to the structural corner. However, the Wolford '957 patent does not have springs in each of the clamping members to individually squeeze a corner bead over an entire length.

Lastly, U.S. Pat. No. 4,593,443 to Wolford discloses a Tool for crimping a corner bead piece over an exterior plasterboard corner that has two faces angled at a substantially right angle to one another across an interior corner, and a crimping pin is carried relative to each face operable to move from one position recessed behind the faces to another position projected forwardly beyond the faces. A post extends away from the corner rearwardly of the faces, and a striker is mounted to move on the post and is connected by linkage to the crimping pins. The tool fits with the faces over a corner bead piece, the piece itself being positioned over an exterior structural corner of meeting plasterboard sheets. The striker is adapted to be hit with a mallet or the like to drive the crimping pins from the recessed position to the projected position, and against the underlying corner bead piece and into the plasterboard, operable to crimp part of the corner bead piece into the plasterboard and secure it over the exterior plasterboard corner. The disclosed tool has magnet means carried on the tool faces, adapted to magnetically cooperate with and releasably hold the corner bead piece as positioned thereagainst. This allows one-hand manipulation of the tool and the corner bead piece as the corner bead piece is first being fitted over the exterior plasterboard corner and prior to crimping the piece with the tool. However, the Wolford '443 patent does not have springs in each of the clamping members to individually squeeze a corner bead over an entire length.

While the above-described devices fulfill their respective, particular objectives and requirements, the aforementioned patents do not describe a bull nose clincher that allows crimping device for applying bull nose corners to dry wall corner connections. The Smith '483, Wolford '957 and Wolford '443 patents make no provision for springs in each of the clamping members to individually squeeze a corner bead over an entire length.

Therefore, a need exists for a new and improved bull nose clincher which can be used for crimping device for applying bull nose corners to dry wall corner connections. In this regard, the present invention substantially fulfills this need. In this respect, the bull nose clincher according to the present invention substantially departs from the conventional concepts and designs of the prior art, and in doing so provides an apparatus primarily developed for the purpose of crimping device for applying bull nose corners to dry wall corner connections.

SUMMARY OF THE INVENTION

In view of the foregoing disadvantages inherent in the known types of drywall corner connections now present in the prior art, the present invention provides an improved bull nose clincher, and overcomes the above-mentioned disadvantages and drawbacks of the prior art. As such, the general purpose of the present invention, which will be described subsequently in greater detail, is to provide a new and improved bull nose clincher and method which has all the advantages of the prior art mentioned heretofore and many novel features that result in a bull nose clincher which is not anticipated, rendered obvious, suggested, or even implied by the prior art, either alone or in any combination thereof.

To attain this, the present invention essentially comprises an elongate position registration member that has a first and second linear front faces forming substantially a right angle, and an arcuate center front face located therebetween. The first linear front face has a first slot and the second linear front face has a second slot therein. A tube is connected to the position registration member back portion. A striker is slidably connected to the tube. A first crimping pin is connected to the striker, and is capable of extending through the first slot. A second crimping pin is connected to the striker and is capable of extending through the second slot.

There has thus been outlined, rather broadly, the more important features of the invention in order that the detailed description thereof that follows may be better understood and in order that the present contribution to the art may be better appreciated.

The invention may also include a first angle registration arm, a second angle registration arm, a cap, a first stop arm, a first linkage, a second stop arm, a second linkage and a spring bias. There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved bull nose clincher that has all of the advantages of the prior art drywall corner connections and none of the disadvantages.

It is another object of the present invention to provide a new and improved bull nose clincher that may be easily and efficiently manufactured and marketed.

An even further object of the present invention is to provide a new and improved bull nose clincher that has a low cost of manufacture with regard to both materials and labor, and which accordingly is then susceptible of low prices of sale to the consuming public, thereby making such bull nose clincher economically available to the buying public.

Still another object of the present invention is to provide a new bull nose clincher that provides in the apparatuses and methods of the prior art some of the advantages thereof, while simultaneously overcoming some of the disadvantages normally associated therewith.

Lastly, it is an object of the present invention is to provide a bull nose clincher for crimping device for easily applying bull nose corners to dry wall corner connections.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE PREFERRED EMBODIMENT

Figure 1:
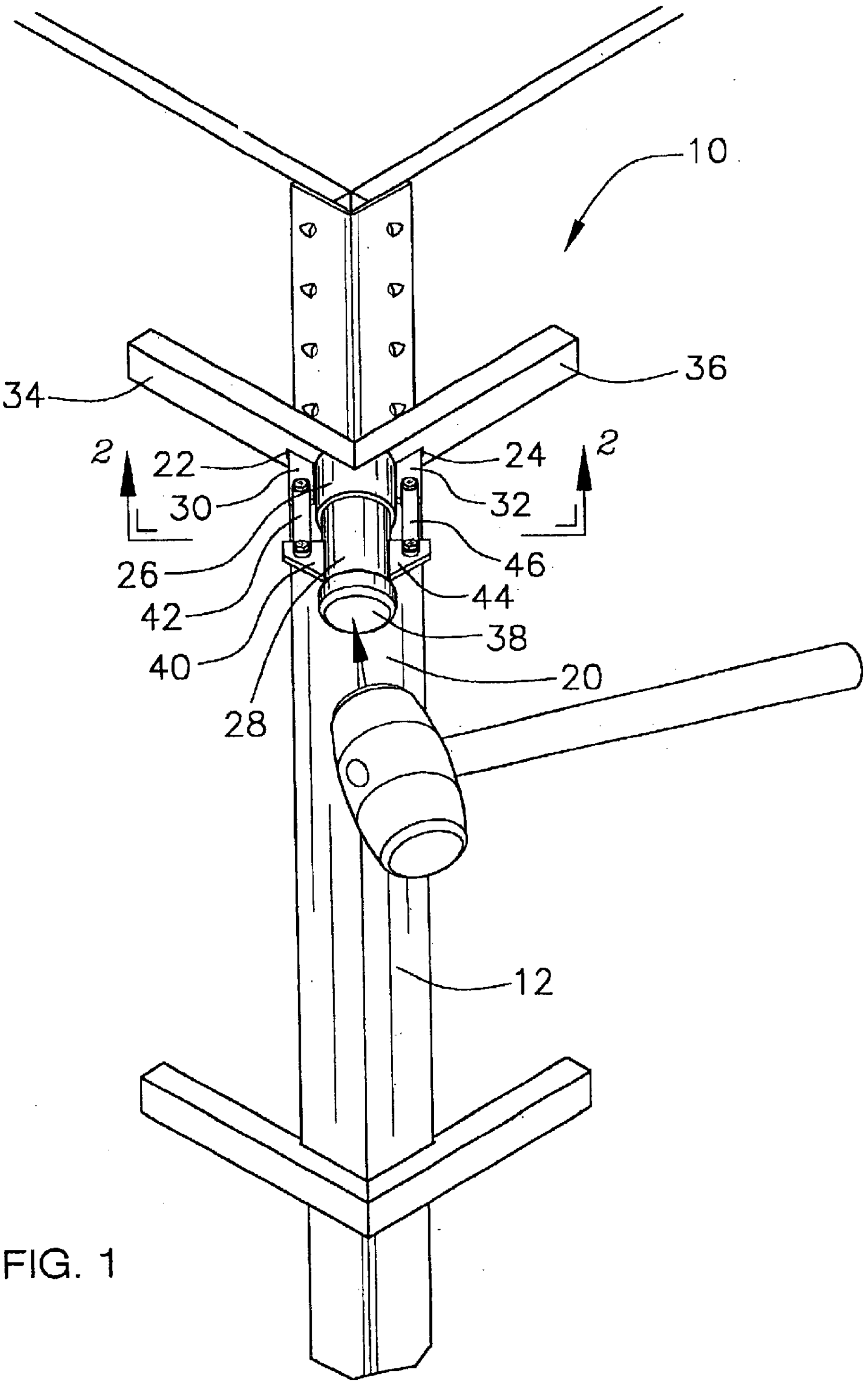
FIG. 1 is a top perspective view of the preferred embodiment of the bull nose clincher constructed in accordance with the principles of the present invention.
Figure 2:
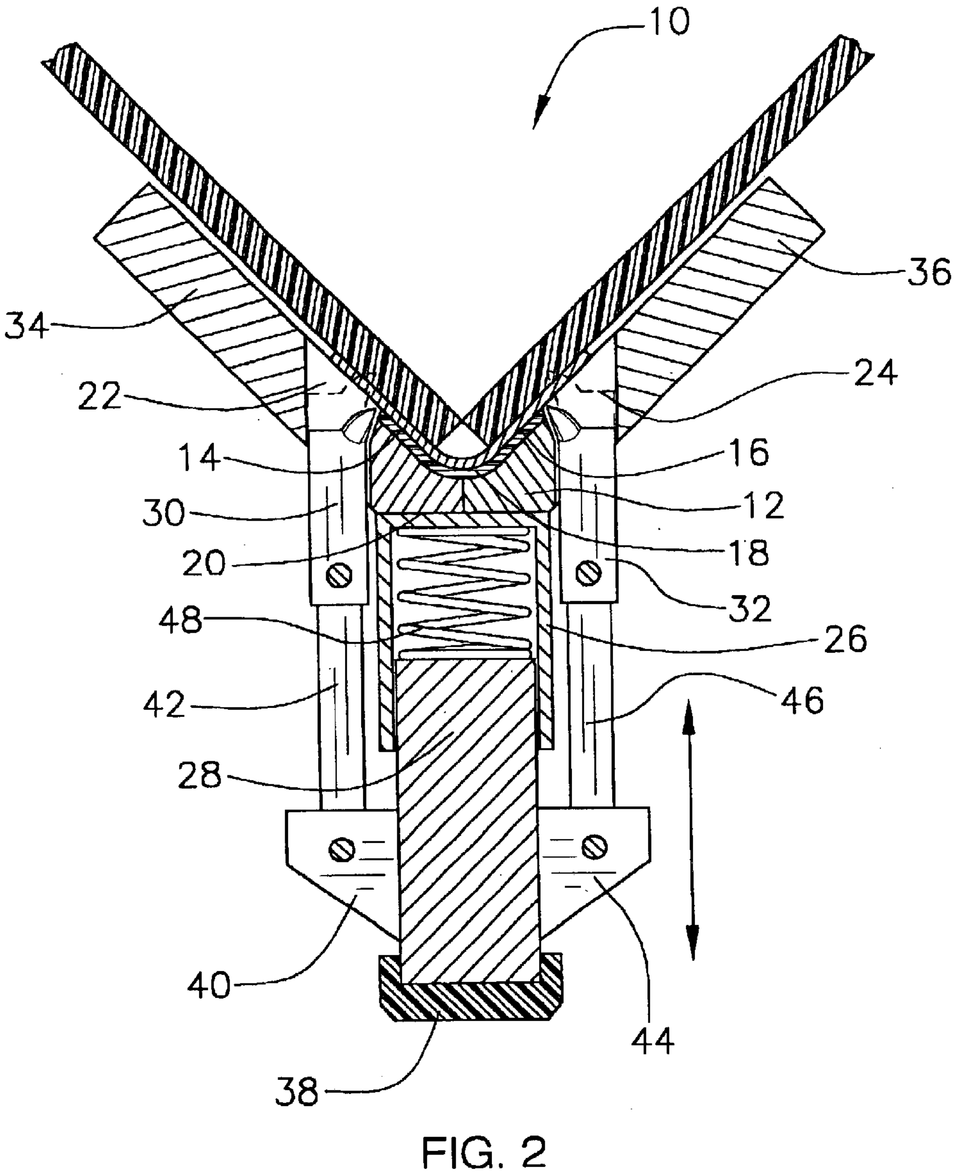
FIG. 2 is a section 2—2 view of FIG. 1 of the bull nose clincher of the present invention.
Figure 3:
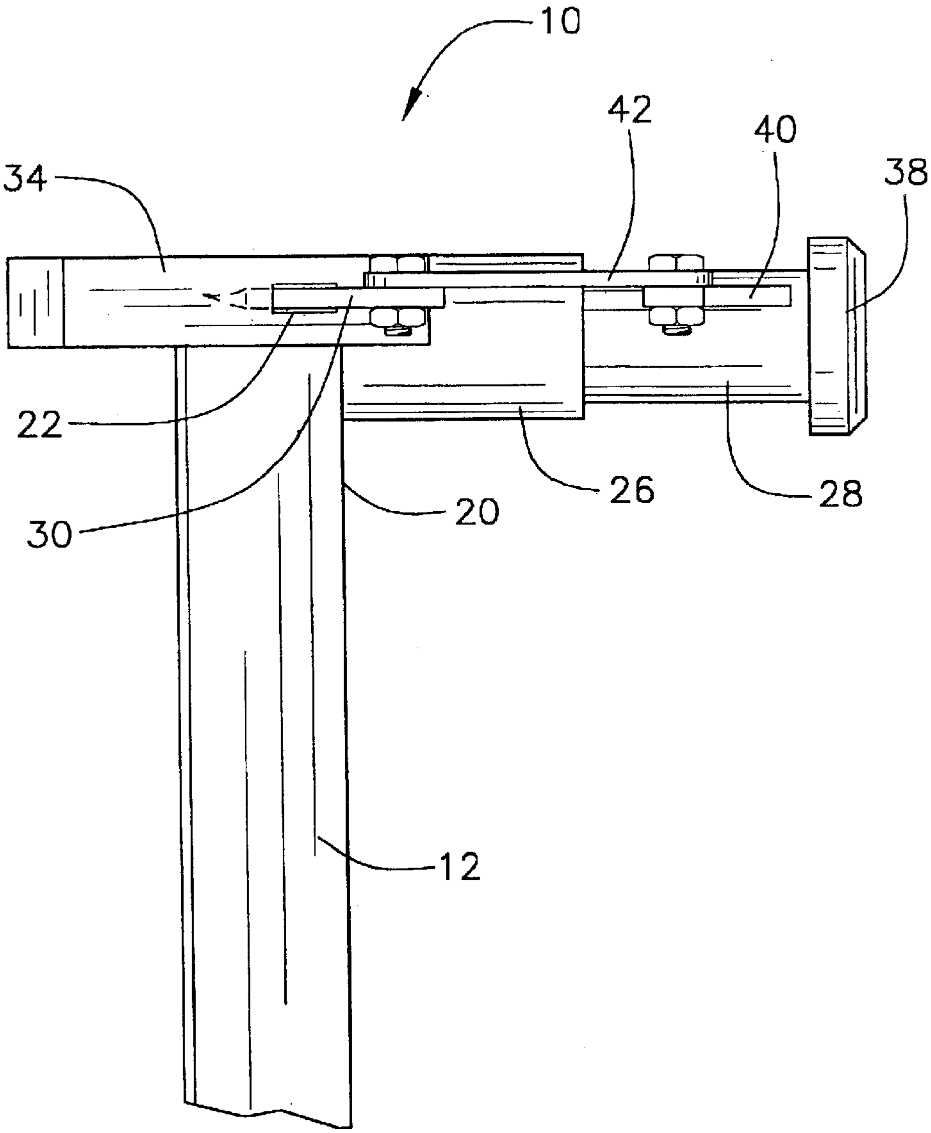
FIG. 3 is a left side view of the bull nose clincher of the present invention.

Referring now to the drawings, and particularly to FIGS. 1–3, a preferred embodiment of the bull nose clincher of the present invention is shown and generally designated by the reference numeral 10.

In FIG. 1, a new and improved bull nose clincher 10 of the present invention for crimping device for applying bull nose corners to dry wall corner connections is illustrated and will be described. More particularly, the bull nose clincher 10 has an elongate position registration member 12, that in the present example is 12 inches long by 1½ inches wide. The position registration member 12 has a back portion 20. A tube 26 is connected to the position registration member back portion 20. A striker 28 is slidably connected to the tube 26. A first crimping pin 30 is connected to the striker 28. A second crimping pin 32 is connected to the striker 28. A first stop arm 40 is connected to the striker 28. A first linkage 42 is pinably connected to the first stop arm 40. The first linkage 42 is pinably connected to the first crimping pin 30. A second stop arm 44 is connected to the striker 28. A second linkage 46 is pinably connected to the second stop arm 44. The second linkage 46 is pinably connected to the second crimping pin 32. An elongate first angle registration arm 34 is connected to the position registration member 12. An elongate second angle registration arm 36 is connected to the position registration member 12. A cap 38 is connected to the striker 28.

In FIG. 2, the bull nose clincher 10 is illustrated and will be described. More particularly, the bull nose clincher 10 has the elongate position registration member 12 that has two linear front faces, a first linear front face 14 and a second linear front face 16 forming substantially right angles. The position registration member 12 has an arcuate center front face 18 located between the first linear front face 14 and the second linear front face 16. The position registration member 12 has the back portion 20. The position registration member first linear front face 14 has a first slot therein 22. The position registration member second linear front face 16 has a second slot therein 24. The tube 26 is connected to the position registration member back portion 20. The striker 28 is slidably connected to the tube 26. A spring bias 48 is disposed between the tube 26 and the striker 28. The first crimping pin 30 is connected to the striker 28. The first crimping pin 30 is capable of extending through the position registration member first linear front face first slot 22. The second crimping pin 32 is connected to the striker 28. The second crimping pin 32 is capable of extending through the position registration member second linear front face second slot 24. The first stop arm 40 is connected to the striker 28. The first linkage 42 is pinably connected to the first stop arm 40. The first linkage 42 is pinably connected to the first crimping pin 30. The second stop arm 44 is connected to the striker 28. The second linkage 46 is pinably connected to the second stop arm 44. The second linkage 46 is pinably connected to the second crimping pin 32. The elongate first angle registration arm 34 is connected to the position registration member 12. The first angle registration arm 34 is substantially parallel to the position registration member linear first front face 14. The elongate second angle registration arm 36 is connected to the position registration member 12. The second angle registration arm 36 is substantially parallel to the position registration member linear second front face 16. The cap 38 is connected to the striker 28.

In FIG. 3, the bull nose clincher 10 is illustrated and will be described. More particularly, the bull nose clincher 10 has the elongate position registration member 12. The position registration member 12 has the back portion 20. The tube 26 is connected to the position registration member back portion 20. The striker 28 is slidably connected to the tube 26. The spring bias 48 is disposed between the tube 26 and the striker 28. The first crimping pin 30 is connected to the striker 28. The first stop arm 40 is connected to the striker 28. The first linkage 42 is pinably connected to the first stop arm 40. The first linkage 42 is pinably connected to the first crimping pin 30. The elongate first angle registration arm 34 is connected to the position registration member 12. The cap 38 is connected to the striker 28.

In use, it can now be understood that the bull nose clincher is used as a conventional bull nose clincher. The bull nose clincher is tapped by a mallet to lock part of the corner bead in place.

While a preferred embodiment of the bull nose clincher has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable sturdy material such as plastic or composite may be used instead of the metal described. And although crimping device for applying bull nose corners to dry wall corner connections have been described, it should be appreciated that the bull nose clincher herein described is also suitable for any crimping type activity.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A bull nose clincher comprising:

an elongate position registration member having two linear front faces, a first linear front face and a second linear front face forming substantially a right angle, said position registration member having an arcuate center front face is located between said first linear front face and said second linear front face, said position registration member having a back portion, said position registration member first linear front face having a first slot therein, said position registration member second linear front face having a second slot therein;

a tube connected to said position registration member back portion;

a striker slidably connected to said tube;

a first crimping pin connected to said striker, said first crimping pin capable of extending through said position registration member first linear front face first slot;

a second crimping pin connected to said striker, said second crimping pin capable of extending through said position registration member second linear front face second slot; and a first stop arm connected to said striker.

2. The bull nose clincher of claim 1 further comprising:

a first linkage pinably connected to said first stop arm, said first linkage pinably connected to said first crimping pin.

3. The bull nose clincher of claim 2 further comprising:

a second stop arm connected to said striker.

4. The bull nose clincher of claim 3 further comprising:

a second linkage pinably connected to said second stop arm, said second linkage pinably connected to said second crimping pin.

5. A bull nose clincher comprising:

an elongate position registration member having two linear front faces, a first linear front face and a second linear front face forming substantially a right angle, said position registration member having an arcuate center front face is located between said first linear front face and said second linear front face said position registration member having a back portion, said position registration member first linear front face having a first slot therein, said position registration member second linear front face having a second slot therein;

a tube connected to said position registration member back portion;

a striker slidably connected to said tube;

a spring bias disposed between said tube and said striker;

a first crimping pin connected to said striker, said first crimping pin capable of extending through said position registration member first linear front face first slot;

a second crimping pin connected to said striker, said second crimping pin capable of extending through said position registration member second linear front face second slot;

an elongate first angle registration arm connected to said position registration member, said first angle registration arm substantially parallel to said position registration member linear first front face;

an elongate second angle registration arm connected to said position registration member, said second angle registration arm substantially parallel to said position registration member linear second front face;

a cap connected to said striker; and a first stop arm connected to said striker.

6. The bull nose clincher of claim 5 further comprising:

a first linkage pinably connected to said first stop arm, said first linkage pinably connected to said first crimping pin.

7. The bull nose clincher of claim 6 further comprising:

a second stop arm connected to said striker.

8. The bull nose clincher of claim 7 further comprising:

a second linkage pinably connected to said second stop arm, said second linkage pinably connected to said second crimping pin.

9. A bull nose clincher comprising:

an elongate position registration member having two linear front faces, a first linear front face and a second linear front face forming substantially a right angle, said position registration member having an arcuate center front face is located between said first linear front face and said second linear front face, said position registration member having a back portion, said position registration member first linear front face having a first slot therein, said position registration member second linear front face having a second slot therein;

a tube connected to said position registration member back portion;

a striker slidably connected to said tube;

a spring bias disposed between said tube and said striker;

a first crimping pin connected to said striker, said first crimping pin capable of extending through said position registration member first linear front face first slot;

a second crimping pin connected to said striker, said second crimping pin capable of extending through said position registration member second linear front face second slot;

a first stop arm connected to said striker;

a first linkage pinably connected to said first stop arm, said first linkage pinably connected to said first crimping pin;

a second stop arm connected to said striker;

a second linkage pinably connected to said second stop arm, said second linkage pinably connected to said second crimping pin;

an elongate first angle registration arm connected to said position registration member, said first angle registration arm substantially parallel to said position registration member linear first front face;

an elongate second angle registration arm connected to said position registration member, said second angle registration arm substantially parallel to said position registration member linear second front face; and a cap connected to said striker.

* * * * *